(12) United States Patent
Wang et al.

(10) Patent No.: US 12,008,767 B2
(45) Date of Patent: Jun. 11, 2024

(54) SYSTEMS AND METHODS FOR IMAGE SEGMENTATION

(71) Applicant: ZHEJIANG DAHUA TECHNOLOGY CO., LTD., Zhejiang (CN)

(72) Inventors: Feng Wang, Hangzhou (CN); Lijian Mao, Hangzhou (CN); Haitao Sun, Hangzhou (CN); Jianping Xiong, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 384 days.

(21) Appl. No.: 17/358,003

(22) Filed: Jun. 25, 2021

(65) Prior Publication Data

US 2021/0327070 A1 Oct. 21, 2021

Related U.S. Application Data

(63) Continuation of application No. PCT/CN2018/123619, filed on Dec. 25, 2018.

(51) Int. Cl.
*G06T 7/194* (2017.01)
*G06T 7/11* (2017.01)
(Continued)

(52) U.S. Cl.
CPC ............ *G06T 7/194* (2017.01); *G06T 7/11* (2017.01); *G06V 10/25* (2022.01); *G06V 10/50* (2022.01)

(58) Field of Classification Search
CPC . G06T 2207/20021; G06T 7/11; G06T 7/194; G06T 2207/20052;
(Continued)

(56) References Cited

U.S. PATENT DOCUMENTS 9,977,995 B2   5/2018  Huang
10,013,614 B2  7/2018  Granström
(Continued)

FOREIGN PATENT DOCUMENTS

CN   103914561 A   7/2014
CN   104077765 A   10/2014
(Continued)

OTHER PUBLICATIONS

Liu, Y., Zou, L., Li, J., Yan, J., Shi, W., & Deng, D. (2016). Segmentation by weighted aggregation and perceptual hash for pedestrian detection. Journal of Visual Communication and Image Representation, 36, 80-89. (Year: 2016).*

(Continued)

*Primary Examiner* — Ross Varndell
*Assistant Examiner* — Emmanuel Silva-Avina
(74) *Attorney, Agent, or Firm* — METIS IP LLC

(57) ABSTRACT

The present disclosure relates to systems and methods for image segmentation. The system may include at least one processor that is directed to obtain an image; divide the image into a plurality of image blocks; determine, for each of the plurality of image blocks, a compressed representation of one or more features of the image block; group the plurality of image blocks into at least two different categories based on the plurality of compressed representations; and extract a region of interest from the image based on at least one of the at least two different categories of the plurality of image blocks.

16 Claims, 10 Drawing Sheets

(51) Int. Cl.
*G06V 10/25* (2022.01)
*G06V 10/50* (2022.01)

(58) Field of Classification Search
CPC .......... G06T 2207/20032; G06V 10/25; G06V 10/50; G06V 10/54; G06V 10/56; G06V 10/28; G06V 10/30
USPC .......................................................... 382/181
See application file for complete search history.

(56) References Cited

U.S. PATENT DOCUMENTS

| | | | |
|---|---|---|---|
| 2013/0223683 A1 | 8/2013 | Jiang et al. | |
| 2015/0117778 A1* | 4/2015 | Doi | H04N 1/4092 382/242 |
| 2017/0150148 A1* | 5/2017 | Zhang | H04N 19/625 |
| 2019/0138813 A1* | 5/2019 | Pereira | G10L 15/02 |

FOREIGN PATENT DOCUMENTS

| | | |
|---|---|---|
| CN | 105678699 A | 6/2016 |
| CN | 106204613 A | 12/2016 |
| CN | 107424172 A | 12/2017 |
| CN | 109064475 A | 12/2018 |
| EP | 2863362 A1 | 4/2015 |

OTHER PUBLICATIONS

Jian Ji, Linyi Han, Jiajie Wei, Xiaojia Lü, Xlaoyuan Li, "Histogram-based perceptual hash algorithm for synthetic aperture radar image segmentation," (Jun. 28, 2018) J. Electron. Imag. 27(3) 033044 (Year: 2018).*

Sufyan Y. Ababneh et al., Automatic Graph-Cut Based Segmentation of Bones from Knee Magnetic Resonance Images for Osteoarthritis Research, Medical Image Analysis, 2011, 30 pages.

Christoph Zauner, Implementation and Benchmarking of Perceptual Image Hash Functions, Revista Musical Chilena, 2010, 107 pages.

The Extended European Search Report in European Application No. 18945288.1 dated Nov. 8, 2021, 8 pages.

International Search Report in PCT/CN2018/123619 dated Sep. 24, 2019, 5 pages.

Written Opinion in PCT/CN2018/123619 dated Sep. 24, 2019, 4 pages.

\* cited by examiner

SYSTEMS AND METHODS FOR IMAGE SEGMENTATION

CROSS-REFERENCE TO RELATED APPLICATIONS

This application is a continuation of International Patent Application No. PCT/CN2018/123619, filed on Dec. 25, 2018, the contents of which are hereby incorporated by reference.

TECHNICAL FIELD

The present disclosure generally relates to methods, systems, and media for image processing. More particularly, the present disclosure relates to methods, systems, and media for segmenting an image.

BACKGROUND

With advances in image processing technology, image segmentation techniques have been widely used. A typical image segmentation technique may be used to segment different portions of an image. For example, an image segmentation technique can be used to segment out a main object (e.g., a foreground) from a background of the image. With such operation, the main object and the background can be processed separately.

In some embodiments, the image segmentation technique may include an image editing operation that can assist in segregating the main object from the background of the image. For example, the image editing operation may permit a user to manually select a region in the image by, for example, manually tracing a boundary line around the main object. Similarly, the image editing operation may select a region in the image based on one or more user-selected points or areas that lie inside or outside the main object. Unfortunately, the image editing operation may have a number of shortcomings.

For example, the image editing operation may be tedious and difficult to use for a user. Specifically, the manual input of boundary lines, points, and/or areas may cost a lot of time of the user. Moreover, the accuracy of the segmentation result may be largely affected by the input of the user.

SUMMARY

In some aspects of the present disclosure, a system for image segmentation is provided. The system may include at least one processor and a storage. The storage may store instructions. When the at least one processor executes the set of instructions, the at least one processor may be directed to perform one or more of the following operations. The at least one processor may obtain an image. The at least one processor may divide the image into a plurality of image blocks. The at least one processor may determine, for each of the plurality of image blocks, a compressed representation of one or more features of the image block. The at least one processor may group the plurality of image blocks into at least two different categories based on the plurality of compressed representations. And the at least one processor may extract a region of interest from the image based on at least one of the at least two different categories of the plurality of image blocks.

In some embodiments, the compressed representation of one or more features of the image block includes a set of binary codes.

In some embodiments, the plurality of image blocks are grouped based on a bit distribution in the set of binary codes.

In some embodiments, the set of binary codes are generated according to a perceptual hash algorithm.

In some embodiments, the one or more feature of the image block includes a texture feature of the image block.

In some embodiments, the at least two categories include a category associated with a foreground of the image and a category associated with a background of the image.

In some embodiments, to extract a region of interest from the image based on at least one of the at least two different categories of the plurality of image blocks, the at least one processor is directed to determine, among at least one of the at least two categories of image blocks, one or more target image blocks based on one or more neighboring image blocks thereof; and extract the region of interest from the image based on the one or more target image blocks.

In some embodiments, to extract the region of interest from the image based on the one or more target image block, the at least one processor is directed to merge the target image blocks that belong to one of the at least two different categories to form the region of interest.

In some embodiments, to extract the region of interest from the image based on the one or more target image block, the at least one processor is directed to connect two or more target image blocks; and extract the region of interest from the image based on the connected two or more target image blocks.

In some embodiments, to determine, among at least one of the at least two categories of image blocks, one or more target image blocks based on one or more neighboring image blocks thereof, the at least one processor is directed to determine a candidate image block and its one or more neighboring image blocks; determine, for each of the one or more neighboring image blocks of the candidate image block, a category to which the neighboring image block belongs; and designate the candidate image block as a target image block in response to that the one or more neighboring image blocks of the candidate image block belong to a same category.

In some embodiments, the at least one processor is further directed to optimize the extracted region of interest.

In some aspects of the present disclosure, a method for image segmentation is provided. The method may be implemented on a computing device having at least one processor and at least one computer-readable storage medium. The method may include one or more of the following operations. The processor may obtain an image. The processor may divide the image into a plurality of image blocks. The processor may determine, for each of the plurality of image blocks, a compressed representation of one or more features of the image block. The processor may group the plurality of image blocks into at least two different categories based on the plurality of compressed representations. And the processor may extract a region of interest from the image based on at least one of the at least two different categories of the plurality of image blocks.

In some aspects of the present disclosure, a non-transitory computer readable medium is provided. The non-transitory computer readable medium may include a set of instructions for image segmentation. When at least one processor executes the set of instructions, the at least one processor may be directed to perform one or more of the following operations. The at least one processor may obtain an image. The at least one processor may divide the image into a plurality of image blocks. The at least one processor may determine, for each of the plurality of image blocks, a compressed representation of one or more features of the image block. The at least one processor may group the plurality of image blocks into at least two different categories based on the plurality of compressed representations. And the at least one processor may extract a region of interest from the image based on at least one of the at least two different categories of the plurality of image blocks.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

Figure 2:
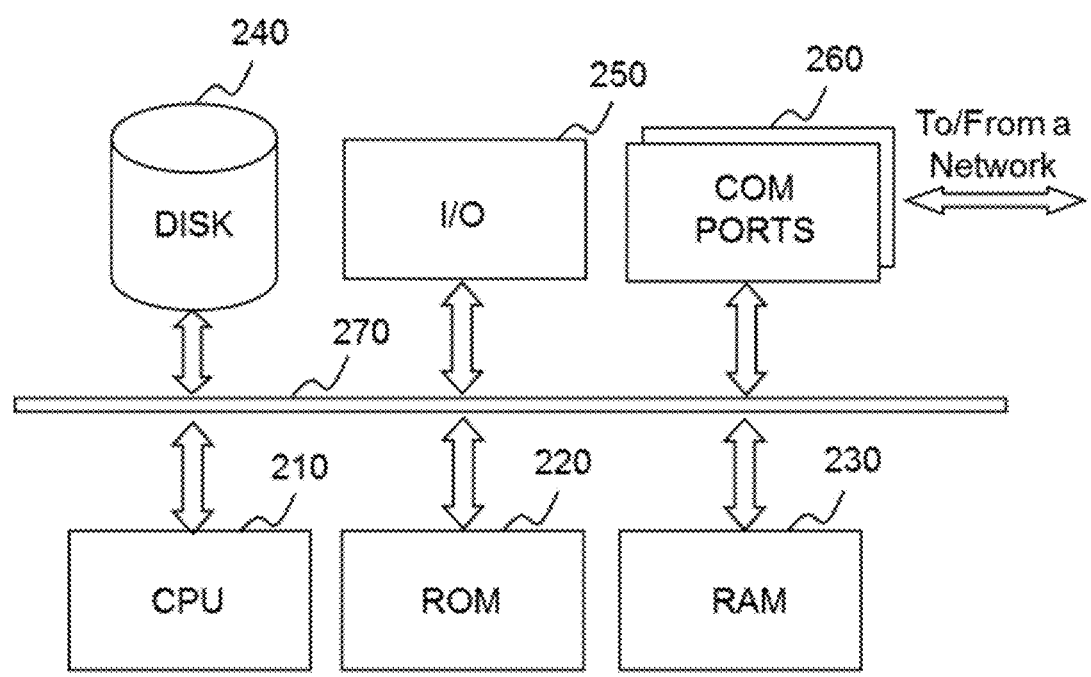
FIG. 2 is a block diagram illustrating an exemplary computing device according to embodiments of the present disclosure of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to systems and/or methods for image segmentation. It shall be noted that a region of interest in an image may at least share one or more similar features that are differentiated from other regions in the image. In order to extract the region of interest from the image, the image may be divided into a plurality of image blocks. Each of the plurality of image blocks may have a compressed representation associated with one or more features of the image block. In some embodiments, the compressed representation of an image block may be a fingerprint of the image block generated according to a perceptual hash algorithm. The plurality of image blocks may be grouped into at least two different categories based on the plurality of compressed representation to gather the image blocks with similar or same features together. The region of interest may be extracted based on at least one of the at least two different categories.

Figure 1:
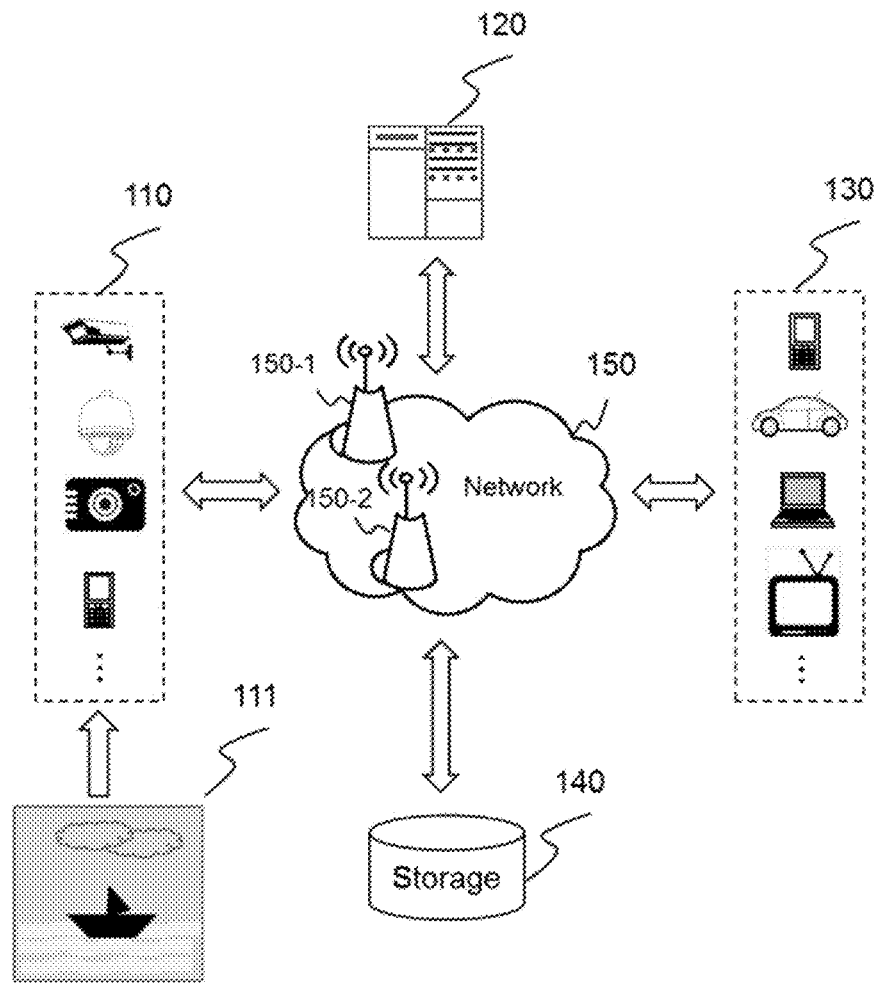
FIG. 1 is a schematic diagram illustrating an exemplary image processing system according to some embodiments of the present disclosure.

FIG. 1 is a schematic diagram illustrating an exemplary image processing system 100 according to some embodiments of the present disclosure. The image processing system 100 may include an image capturing device 110, a processing device 120, a terminal 130, a storage 140, a network 150, and/or any other suitable component for image processing in accordance with various embodiments of the disclosure.

In some embodiments, the image processing system 100 may be configured to process an image by, for example, recognizing an object in the image, identifying an area in the image, extracting different areas with different features in the image, etc. For example, the image processing system 100 may analyze an image of a water area (a river, a lake, or an area of the sea), and identify an object or region in the image. The object or region may include a pollutant, a person or a boat in the water, a shoal of fishes, a water construction, etc. As another example, the image processing system 100 may analyze an image of a logistics warehouse, and identify an overloaded or underloaded region in the logistics warehouse. Accordingly, the keeper of the logistics warehouse may adjust the package placing and moving strategy. As another example, the image processing system 100 may analyze an image of an aircraft flying in the sky, and detect the aircraft in the image. Furthermore, the image processing system 100 may analyze a real-time video of an aircraft flying in the sky, and locate the aircraft in the video to track the aircraft in real time.

The image capturing device 110 may be used to capture an image 111. The image 111 may include a still image, a motion image, a video (offline or live streaming), a frame of a video, or the like, or a combination thereof. In some embodiments, there may be one or more distinctive regions in the image 111 that are differentiated from other portions in the image 111. For brevity, the one or more distinctive regions may be referred to as a "foreground" and the other portions may be referred to as a "background" of the image 111. The foreground and background may be different from each other in color, texture, brightness, chrominance, etc. The foreground may include an object of interest, or a region of interest, etc. Merely by way of example, as shown in FIG. 1, the boat in black color in the image 111 may be an object of interest and deemed as the foreground of the image 111. The light-colored water may be deemed as the background of the image 111. In some embodiments, the foreground and/or background of the image 111 may be further extracted from the image 111 according to an image segmentation process as described elsewhere in the present disclosure.

The image capturing device 110 may be any suitable device that is capable of capturing an image. The image capturing device 110 may be and/or include a camera, a sensor, a video recorder, a mobile phone, or the like, or any combination thereof. For example, the image capturing device 110 may be and/or include any suitable type of camera, such as a fixed camera, a mobile camera, a dome camera, a covert camera, a Pan-Tilt-Zoom (PTZ) camera, a thermal camera, etc. As another example, the image capturing device 110 may be and/or include any suitable type of sensor, such as an audio sensor, a light sensor, a wind speed sensor, or the like, or a combination thereof.

In some embodiments, the image capturing device 110 may obtain a plurality of images, and send the plurality of images to the image processing device 120 for further processing. In some embodiments, the image capturing device 110 may obtain a video, and send the video to the image processing device 120 through the network 150. The video may be sent as a series of image frames.

Data obtained by the image capturing device 110 (e.g., the image 111) may be stored in the storage 140, sent to the processing device 120 or the terminal 130 via the network 150. In some embodiments, the image capturing device 110 may be integrated in the terminal 130.

The processing device 120 may process images and/or data relating to one or more functions described in the present disclosure. For example, the processing device 120 may process images received from the image capturing device 110 and output processed images to the storage 140 and/or the terminal 130 through the network 150. In some embodiments, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing device 120 may be integrated in the terminal 130. In some embodiments, the processing device 120 may automatically recognize the foreground/background of an image, and further extract the foreground/background of the image according to an image segmentation process.

The terminal 130 may receive, display, and/or process images. For example, the terminal 130 may receive images from the image capturing device 110, the processing device 120, the storage 140, the network 150, etc. As another example, the terminal 130 may output or display the image 111 received from the image capturing device 110 and/or a processed image received from the processing device 120 via the network 150 to a user. As another example, the terminal 130 may process images received from the image capturing device 110, the processing device 120, the storage 140, the network 150, etc.

The terminal 130 may be connected to or communicate with the processing device 120. The terminal 130 may allow one or more operators (e.g., a keeper of a logistics warehouse, a law enforcement officer) to control the production and/or display of the data (e.g., the image captured by the image capturing device 110) on a display. The terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with tactile feedback), a speech input, an eye tracking input, a brain monitoring system, or any other comparable input mechanism. The input information received through the input device may be communicated to the processing device 120 via the network 150 for further processing. Another type of the input device may include a cursor control device, such as a mouse, a trackball, or cursor direction keys to communicate direction information and command selections to, for example, the processing device 120 and to control cursor movement on the display.

A display may display the information received (e.g., the image captured by the image capturing device 110) from other components of the image processing system 100. The information may include data before and/or after data processing, a parameter relating to image capturing and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The storage 140 may acquire and/or store information of the components (e.g., the image capturing device 110, the processing device 120, or the terminal 130) of the image processing system 100. For example, the storage 140 may acquire and store images from the processing device 120. In some embodiments, the information acquired and/or stored by the storage 140 may include programs, software, algorithms, functions, files, parameters, data, texts, numbers, images, or the like, or any combination thereof. In some embodiments, the storage 140 may store images received from the image capturing device 110 and processed images received from the processing device 120 with different formats including, for example, bmp, jpg, png, tiff, gif, pcx, tga, exif, fpx, svg, psd, cdr, pcd, dxf, ufo, eps, ai, raw, WMF, or the like, or any combination thereof. In some embodiments, the storage 140 may store algorithms (e.g., a Hash algorithm, a pHash algorithm, a filter algorithm, etc.) applied in the processing device 120. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc.

The network 150 may facilitate exchange of information. In some embodiments, one or more components in the image processing system 100 (e.g., the image capturing device 110, the terminal 130, the processing device 120 and the storage 140) may send information to other component(s) in the image processing system 100 via the network 150. For example, the storage 140 may receive and store the image 111 via the network 150. In some embodiments, the network 150 may be any type of a wired or wireless network, or a combination thereof. Merely by way of example, the network 150 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points 150-1, 150-2 . . . through which one or more components of the image processing system 100 may be connected to the network 150 to exchange data and/or information.

It should be noted that the description above in relation to the image processing system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the image capturing device 110 may be integrated in the terminal 130. In some embodiments, part or all of the image data generated by the image capturing device 110 may be processed by the terminal 130. In some embodiments, the image capturing device 110 and the processing device 120 may be implemented in one single device configured to perform the functions of the image capturing device 110 and the processing device 120 described in this disclosure. In some embodiments, the terminal 130 and the storage 140 may be part of the processing device 120. Similar modifications should fall within the scope of the present disclosure.

FIG. 2 is a block diagram illustrating an exemplary computing device 200 according to embodiments of the present disclosure of the present disclosure. The processing device 120 and/or the terminal 130 may be implemented using one or more computing devices 200 and/or one or more portions of the computing devices 200.

Referring back to FIG. 2, the computing device 200 may include a processor (CPU) 210, a read only memory (ROM) 220, a random-access memory (RAM) 230, a disk 240, an input/output (I/O) component 250, a COM ports 260, and an internal communication bus 270.

The processor 210 may execute instructions and/or data to perform one or more functions described in the present disclosure. For example, the processor 210 may extract a region of interest from an image. In some embodiments, the processor 210 may include one or more processors (e.g., single-core processor(s) or multi-core processor(s)). Merely by way of example, the processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 210 is described in the computing device 200. However, it should be noted that the computing device 200 in the present disclosure may also include multiple processors, thus operations and/or method steps that are performed by one processor 210 as described in the present disclosure may also be jointly or separately performed by the multiple CPUs/processors. For example, if in the present disclosure the processor 210 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 220, the RAM 230, and/or the disk 240 may store data and/or instructions that may perform one or more functions described in the present disclosure. For example, the ROM 220, the RAM 230, and/or the disk 240 may store instructions executed by the processor 210 to extract the region of interest from an image. In some embodiments, the RAM 230 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 220 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 240 may include a magnetic disk, an optical disk, a solid-state drive, a flash drive, a floppy disk, an optical disk, a memory card, a zip disk, a magnetic tape, or the like, or any combination thereof. In some embodiments, the ROM 220, the RAM 230, and/or the disk 240 may include a data storage, an application, etc. In some embodiments, the data storage may be any hardware or software for storing data, including a circuitry, a program, etc. In some embodiments, the application may include any application that may be installed in the computing device 200 for querying data.

The I/O 250 may support an input/output in the computing device 200. Merely by way of example, the I/O 250 may include a display, a keypad/keyboard, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

The COM ports 260 may be connected to and from a network connected thereto to facilitate data communications. In some embodiments, the COM ports 260 may be interface with the network 150 and/or one or more components in the image processing system 100. In some embodiments, the COM ports 260 may be any type of wired or wireless network interface. Merely by way of example, the COM ports 260 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 260 may be implemented according to programming and/or computer language(s). The COM ports 260 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The internal communication bus 270 may transfer information and/or data between one or more components of the computing device 200. For example, the internal communication bus 270 may connect the processor 210 with a storage (e.g., the RAM 230, the ROM 220, etc.) for exchanging information and/or data. In some embodiments, the internal communication bus 270 may include a hardware component and/or a software implementation. For example, the internal communication bus 270 may include a wire, an optical fiber, a cable, a communication protocol, or the like, or any combination thereof.

Figure 3:
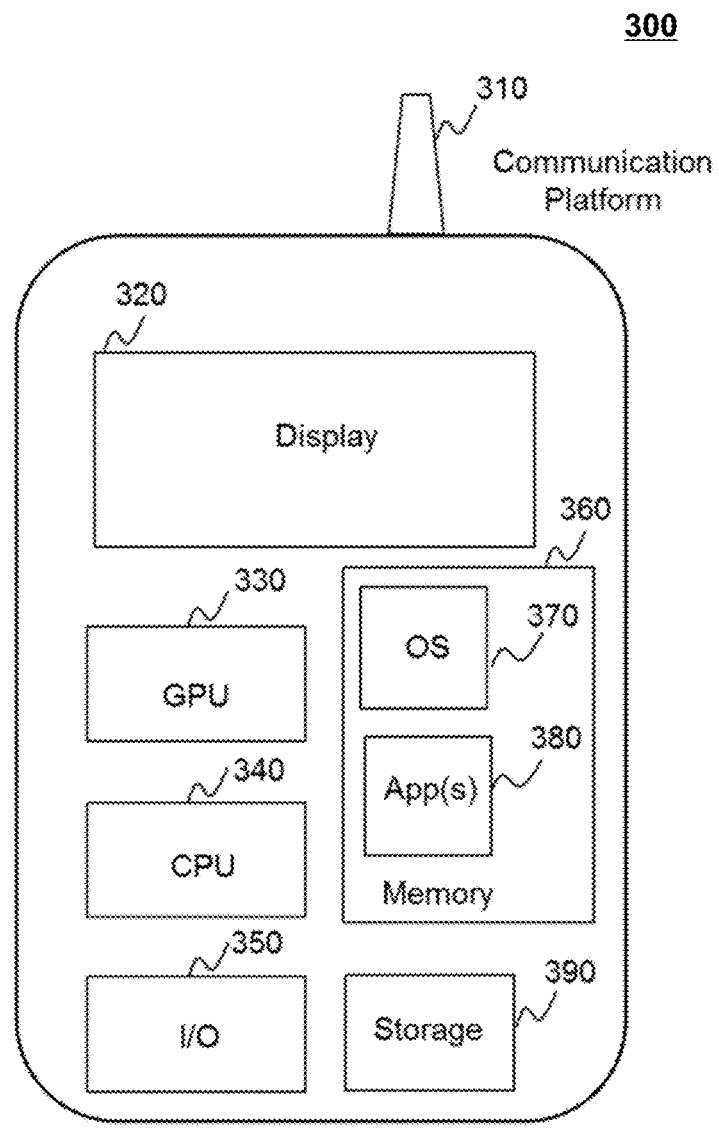
FIG. 3 is a schematic diagram illustrating exemplary hardware and/or software components of an exemplary mobile device on which a terminal may be implemented according to some embodiments of the present disclosure.

FIG. 3 is a schematic diagram illustrating exemplary hardware and/or software components of an exemplary mobile device 300 on which a terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the processing device 120. User interactions with the information stream may be achieved via the I/O 350 and provided to the processing device 120 and/or other components of the image processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
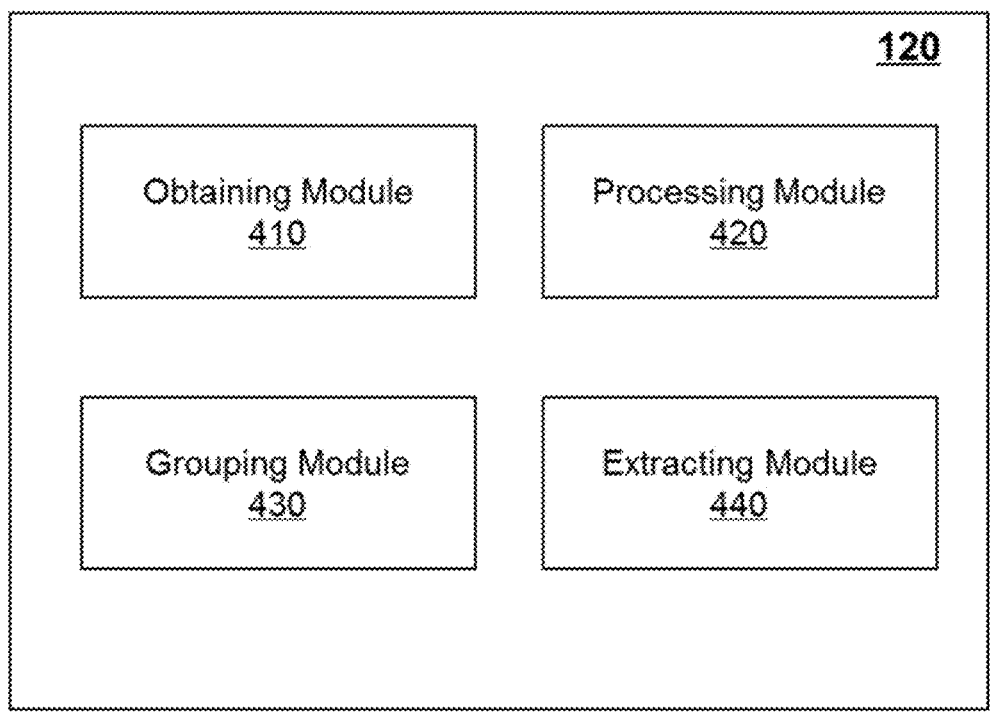
FIG. 4 is a block diagram illustrating an exemplary image processing device according to some embodiments of the present disclosure.

FIG. 4 is a block diagram illustrating an exemplary image processing device according to some embodiments of the present disclosure. In some embodiments, the image processing device 120 may include an obtaining module 410, a processing module 420, a grouping module 430, and an extracting module 440. Two modules in the image processing device 120 may be connected via a wired or wireless connection. The image processing device 120 may be implemented on a computing device as illustrated in FIG. 2 or a mobile device as illustrated in FIG. 3.

The obtaining module 410 may be configured to obtain an image including a region of interest. The image may include a visible light image, an infrared image, a thermal image, an ultrasound image, an X-ray image, or the like. The image processing device 120 may obtain the image and information relating to the image from the terminal 130 and/or the storage 140 via the network 150. The image may include a foreground and a background. The foreground and background may have different colors, textures, brightness, chrominance, etc. The region of interest may be part of the foreground or background of the image. For example, taking the image whose background is a water area (a river, a lake or an area of the sea) as an example, the region of interest, which may be deemed as the foreground, may include a pollutant, a person or a boat, a shoal of fishes, a water construction, etc. As another example, taking the image whose background is the sky as an example, the region of interest, which may be deemed as the foreground, may include an aircraft, a bird, etc. In some embodiments, the image may be an image frame of a video.

In some embodiments, the obtaining module 410 may obtain pixel information and/or instructions regarding, for example, algorithms for image processing, segmenting, etc. The obtaining module 410 may obtain the images and information relating to the images received from the terminal 130 and/or the storage 140 via the network 150. In some embodiments, the images may be taken under various illumination conditions such as 0.5 Lux, 50 Lux, 100 Lux, 500 Lux, 1000 Lux, 10000 Lux, 60000 Lux, 100000 Lux, etc. Herein, Lux is the unit of illumination.

The processing module 420 may process the image obtained from the obtaining module 410. The processing may include reducing the noise in an image by filtering, amplifying, segmenting, resizing, etc., the image. The filtering may include spatial filtering, frequency domain filtering, or the like, or a combination thereof. The spatial filtering, based on pixels of the image, may include linear filtering (e.g., mean filtering, Gaussian filtering, Wiener filtering, etc.) and non-linear filtering (e.g., median filtering, etc.). In some embodiments, the processing module 420 may perform color filtering on the image.

In some embodiments, the processing module 420 may divide the image into a plurality of image blocks. The plurality of image blocks may have the same shape or different shapes. The shape of an image block may be a rectangle, a cycle, an ellipse, a regular polygon, an irregular polygon, etc. The size of each different image blocks may be same or different.

In some embodiments, the processing module 420 may determine, for each of the plurality of image blocks, a compressed representation of one or more features of the image block. The one or more features of an image block may include a texture feature, a color feature, a gray level feature, etc. The compressed representation of one or more features of the image block may be acquired by transforming or encoding the one or more features of the image block into a compressed form (e.g., a series of numbers).

The processing module 420 may generate the fingerprint for each of the plurality of image blocks by implementing a fingerprinting algorithm. In some embodiments, the fingerprinting algorithm may be a perceptual hash (pHash) algorithm.

The grouping module 430 may be configure to group the plurality of image blocks into at least two different categories. The two different categories may be used to distinguish the image blocks with different features. In some embodiments, the plurality of image blocks may be classified into a light-colored category and a dark-colored category based on the color of the plurality of image blocks. In some embodiments, the plurality of image blocks may be classified into a foreground category and a background category of the image.

In some embodiments, the grouping module 430 may group the image blocks with same or similar features into a category, and group the other image blocks into another category. For example, the image processing device 120 may group the image blocks whose compressed representations satisfy a first condition into a first group, and group the image blocks whose compressed representations satisfy a second condition into a second group.

The extracting module 440 may be configured to extract the region of interest from the image. The extracting module 440 may extract the region of interest from the image based on at least one of the at least two different categories of the plurality of image blocks.

In some embodiments, the extracting module 440 may extract the region of interest from the image based on an image segmentation algorithm. The image segmentation algorithm may be the GrabCut algorithm or the GraphCut algorithm.

In some embodiments, the extracting module 440 may merge the image blocks in one of the at least two different categories to form the extracted region of interest. In some embodiments, the image processing device 120 may perform one or more filtering operation on the category corresponding to the region of interest, and further merge the filtered image blocks to form the extracted region of interest.

It should be noted that the above description of the image processing device 120 is merely provided for the purpose of illustration, and not intended to limit the scope of the present disclosure. For persons having ordinary skills in the art, various variations and modifications may be performed in the light of the present disclosure. For example, the obtaining module 410 may also obtain a video. As another example, the processing module 420 may group the plurality of image blocks into at least two different categories, and the grouping module 430 may be omitted.

Figure 5:
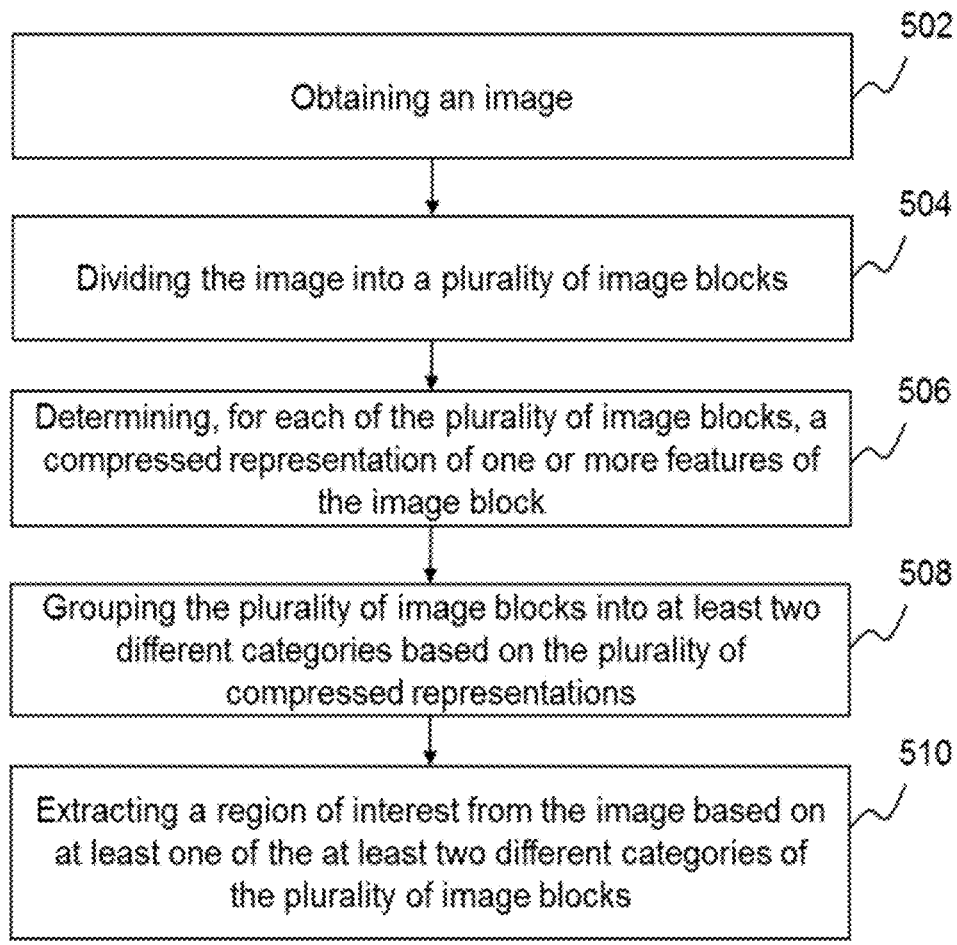
FIG. 5 is a flowchart illustrating an exemplary process for segmenting an image according to some embodiments of the present disclosure.

FIG. 5 is a flowchart illustrating an exemplary process for segmenting an image according to some embodiments of the present disclosure. The process 500 may be executed by the image processing system 100. For example, the process 500 may be implemented as a set of instructions (e.g., an application) stored in the storage ROM 220 or RAM 230. The CPU 210 may execute the set of instructions and may accordingly be directed to perform the process 500. Specifically, the process 500 may be executed by the modules in the image processing device 120. The operations of the illustrated process presented below are intended to be illustrative. In some embodiments, the process may be accomplished with one or more additional operations not described, and/or without one or more of the operations discussed. Additionally, the order in which the operations of the process/method as illustrated in FIG. 5 and described below is not intended to be limiting.

In 502, the image processing device 120 may obtain an image. The image may include a visible light image, an infrared image, a thermal image, an ultrasound image, an X-ray image, or the like. The image processing device 120 may obtain the image and information relating to the image from the terminal 130 and/or the storage 140 via the network 150. The image may include a foreground and a background. The foreground and background may have different colors, textures, brightness, chrominance, etc. The image may include a region of interest that is part of the foreground or background of the image. For example, taking the image whose background is a water area (a river, a lake or an area of the sea) as an example, the region of interest, which may be deemed as the foreground, may include a pollutant, a person or a boat, a shoal of fishes, a water construction, etc. As another example, taking the image whose background is the sky as an example, the region of interest, which may be deemed as the foreground, may include an aircraft, a bird, etc. In some embodiments, the image may be an image frame of a video.

In some embodiments, the image may include more than one region of interest. For example, the number of the regions of interest may be two. Each of the two regions of interest may be identified and extracted from the image according to the subsequent operations of the process 500.

In 504, the image processing device 120 may divide the image into a plurality of image blocks. The plurality of image blocks may have the same shape or different shapes. The shape of an image block may be a rectangle, a cycle, an ellipse, a regular polygon, an irregular polygon, etc. The size of each different image blocks may be same or different. For brevity, the image may have the shape of a rectangle, and the image blocks may be a plurality of smaller rectangles having a same size. The number of the image blocks may be determined based on the size of each image block. For example, assuming that the size of the image is 640*640 pixels, the size of each image block is 8*8 pixels. Therefore, the image is divided into 6400 image blocks.

The region of interest may also be divided and thus distributed in one or more of the plurality of image blocks. In some embodiments, in order to extract the region of interest from the image, the image processing device 120 may need to identify each image blocks that includes at least part of the region of interest. Specifically, the image processing device 120 may determine, from the plurality of image blocks, the image block(s) whose one or more features satisfy a certain condition as the image blocks of the region of interest.

In 506, the image processing device 120 may determine, for each of the plurality of image blocks, a compressed representation of one or more features of the image block. The one or more features of an image block may include a texture feature, a color feature, a gray level feature, etc. The compressed representation of one or more features of the image block may be acquired by transforming or encoding the one or more features of the image block into a compressed form (e.g., a series of numbers).

In some embodiments, the compressed representation of one or more features of the image block may be referred to as a fingerprint of the image block. The fingerprint may be a representation (e.g., a specific code) of a unique set of inherent properties and/or features of the image block. The unique set of inherent properties and/or features included in the fingerprint can be used to differentiate the image blocks from each other.

The image processing device 120 may generate the fingerprint for each of the plurality of image blocks by implementing a fingerprinting algorithm. In some embodiments, the fingerprinting algorithm may be a perceptual hash (pHash) algorithm. The perceptual pHash algorithm may use the frequency information of the image blocks to generate their fingerprints. It shall be noted that an image may be regarded as a two-dimensional signal with different frequencies at different regions. The region with small brightness/color change may correspond to the low-frequency information of the image, and the region with intense brightness/color change (such as the edge of an object) may correspond to the high-frequency information of the image. When implementing the pHash algorithm on an image block, the image processing device 120 may reduce the high frequency information of the image block, and thus generate the fingerprint for the image block mainly based on its low-frequency information. More detailed descriptions regarding the generation of the fingerprint may be further described elsewhere in the present disclosure (e.g., in FIG. 6 and the description thereof).

In 508, the image processing device 120 may group the plurality of image blocks into at least two different categories based on the plurality of compressed representations. The image processing device 120 may group the image blocks with same or similar features into a category, and group the other image blocks into one or more other categories. For example, the image processing device 120 may group the image blocks whose compressed representations satisfy a first condition into a first category, and group the image blocks whose compressed representations satisfy a second condition into a second category.

The image blocks in the region of interest may have similar features which are different from other image blocks. For example, the image blocks in the region of interest may be brighter than other image blocks. For another example, the high-frequency portion of the image blocks in the region of interest may be much more than other image blocks. Accordingly, the image blocks in the region of interest may be grouped into a same category.

Specifically, the plurality of image blocks may be grouped into a foreground category and a background category, provided that the compressed representation of each image block may represent a texture feature thereof. Alternatively, the plurality of image blocks may be grouped into a light-colored category and a dark-colored category, provided that the compressed representation of each image block may represent a color feature thereof. In 510, the image processing device 120 may extract a region of interest from the image based on at least one of the at least two different categories of the plurality of image blocks.

In some embodiments, the image processing device 120 may merge the image blocks in one of the at least two different categories to form the extracted region of interest. In some embodiments, the image processing device 120 may perform one or more filtering operations on the category corresponding to the region of interest, and further merge the filtered image blocks to form the extracted region of interest.

In some embodiments, the image processing device 120 may extract the region of interest from the image based on a GrabCut algorithm or a GraphCut algorithm. For example, the image processing device 120 may designate at least a portion of the region of interest (e.g., delineate a line within the region of interest) by combining multiple image blocks in the category corresponding to the region of interest. Then, the image processing device 120 may traverse the image and extract the area that is similar to the designated portion of the region of interest according to the GrabCut/GraphCut algorithm.

In some embodiments, the image device may process the image blocks of different categories to extract different portions of the image, respectively. The different portions of the image may include a foreground of the image and a background of the image.

In some embodiments, the image processing device 120 may extract the region of interest by curve fitting. The image processing device 120 may identify the image blocks that lie on the boundary of the region of interest from the category corresponding to the region of interest, and fit the boundary curve of the region of interest, accordingly. For example, the image processing device 120 may designate the image block whose neighboring image blocks belong to different categories as one image blocks that lies on the boundary of the region of interest. The region delimited by the boundary curve may be extracted from the image as the region of interest.

In some embodiments, the boundary of the extracted region may be unsmoothed, or the extracted region may need a further processing. The image processing device 120 may optimize the extracted region to generate a more accurate region of interest based on an optimization algorithm. The optimization algorithm may include a genetic algorithm (GA), an ant colony optimization (ACO), a simulated annealing (SA), a particle swarm optimization (PSO), etc. Specifically, the image processing device 120 may smooth the boundary of the extracted region or enlarge the size of the extracted region.

It should be noted that the above description of image processing is merely provided for the purposes of illustration, and not intended to limit the scope of the present disclosure. For persons having ordinary skills in the art, various variations and modifications may be performed in the light of the present disclosure. For example, operations 504 and 506 may be processed simultaneously. As another example, operation 510 may be combined with 508.

Figure 6:
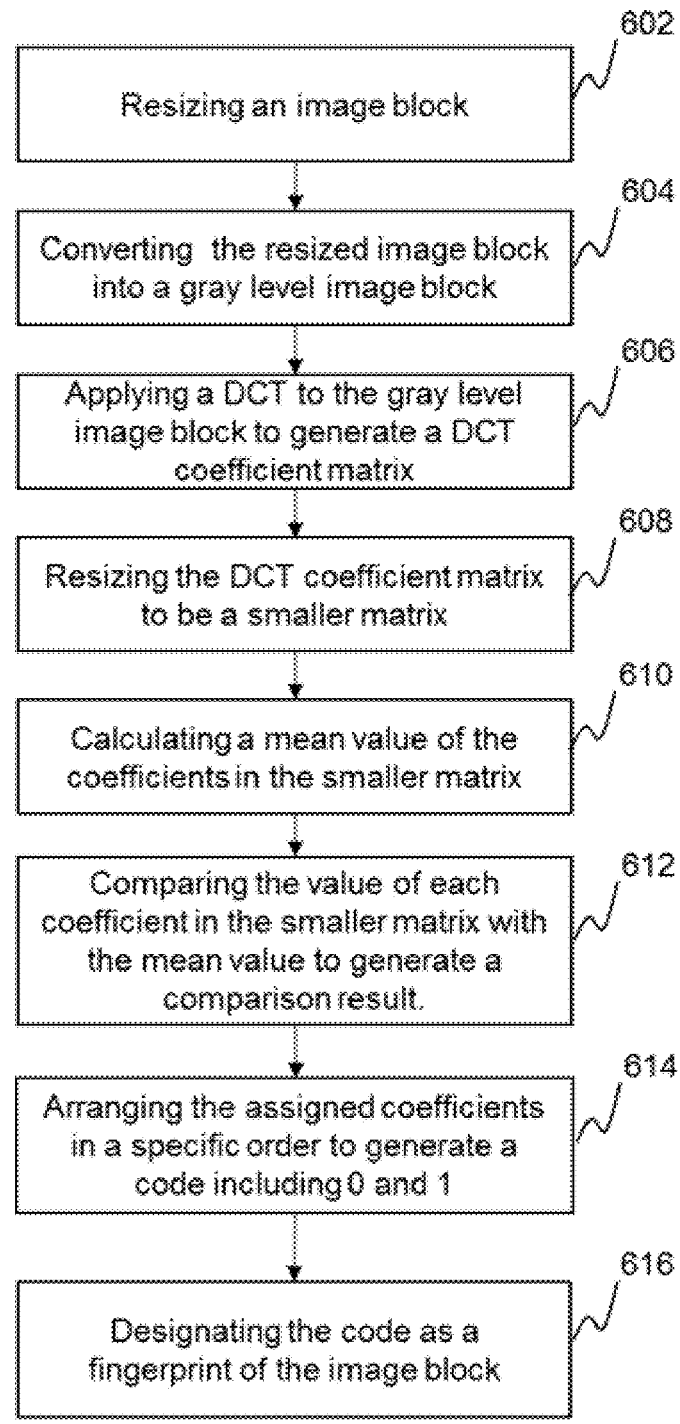
FIG. 6 is a flowchart illustrating an exemplary process for determine a fingerprint of each of the plurality of image blocks according to some embodiments of the present disclosure.

FIG. 6 is a flowchart illustrating an exemplary process for determine a fingerprint of each of the plurality of image blocks according to some embodiments of the present disclosure. The process 600 may be executed by the image processing system 100. For example, the process 600 may be implemented as a set of instructions (e.g., an application) stored in the storage ROM 220 or RAM 230. The CPU 210 may execute the set of instructions and may accordingly be directed to perform the process 600. Specifically, the process 600 may be executed by the modules in the image processing device 120. The operations of the illustrated process presented below are intended to be illustrative. In some embodiments, the process 600 may be accomplished with one or more additional operations not described, and/or without one or more of the operations discussed. Additionally, the order in which the operations of the process as illustrated in FIG. 6 and described below is not intended to be limiting. In some embodiments, operation 506 may be achieved by iteratively performing the process 600. The process 600 may be performed to determine the compressed representation of each of the plurality of image blocks.

In 602, the image processing device 120 may resize an image block. In some embodiments, the image block may be one of the image blocks divided from the image as described in connection with operation 504.

The image block may be resized to a predetermined size. The predetermined size may be N*N pixels. N may be any suitable integer, such as, 8, 16, 32, etc. In some embodiments, the original size of the image block may be larger than the predetermined size, and thus the resizing may include downscaling the image block. For example, an image block whose original size is 64*64 pixels may be downscaled to be a resized image block whose size is 32*32 pixels. The resizing of an image block may include discarding one or more pixels in the image block, or merging one or more pixels. In some embodiments, operation 602 may be omitted if the original size of the image block is exactly the predetermined size.

In 604, the image processing device 120 may convert the resized image block into a gray level image block. It shall be noted that, compared with a colored image block, the corresponding gray level image block may reduce the amount of calculation. The image processing device 120 may perform a grey level transformation on the resized image block to generate the gray level image block. In some embodiments, operation 604 may be omitted if the resized image block is exactly a gray level image block.

In 606, the image processing device 120 may apply a discrete cosine transformation (DCT) to the gray level image block to generate a DCT coefficient matrix. The DCT coefficient matrix may have the size of 32*32.

In 608, the image processing device 120 may resize the DCT coefficient matrix to generate a smaller matrix. In some embodiments, the smaller matrix may have the size of 8*8. The image processing device 120 may designate the top left portion (e.g., the 8*8 sub-matrix on the top left) of the DCT coefficient matrix to be the smaller matrix. The top left part of the DCT coefficient matrix may represent the low-frequency components of the (gray level) image block. It shall be noted that the smaller matrix may further reduce the amount of calculation.

In 610, the image processing device 120 may calculate a mean value of the coefficients in the smaller matrix. In the case that the size of the smaller matrix is 8*8, the number of the coefficients in the smaller matrix is 64. The image processing device 120 may calculate the mean value of the 64 coefficients. The mean value may be stored (e.g., in the storage 140) for subsequent operations.

In 612, the image processing device 120 may compare the value of each coefficient in the smaller matrix with the mean value to generate a comparison result.

The comparison result may indicate whether the value of each coefficient is less than the mean value or not. In response to the comparison result that a coefficient in the smaller matrix is larger than or equal to the mean value, the image processing device 120 may assign the coefficient to be 1. In response to the comparison result that a coefficient in the smaller matrix is less than the mean value, the image processing device 120 may assign the coefficient to be 0.

In such case, the image processing device 120 may compare the 64 coefficients with the mean value to generate 64 comparison results. The 64 comparison results may include 64 integers which are 0 or 1.

In 614, the image processing device 120 may arrange the assigned coefficients in a specific order to generate a code including 0 and 1. The specific order of the arrangement is not limited. For example, the order of the arrangement may be from the left to right, and from the top to bottom in the smaller matrix.

In 616, the image processing device 120 may designate the code as a fingerprint of the image block. As described above, the fingerprint of the image block may include 64 binary bits. The 64 binary bits may be a representation of the low-frequency components of the image block.

It should be noted that the above description of the process 600 is merely provided for the purposes of illustration, and not intended to limit the scope of the present disclosure. For persons having ordinary skills in the art, various variations and modifications may be performed in the light of the present disclosure. For example, instead of designating the low-frequency components of the image block in operation 608, the image processing device 120 may designate other part of the DCT coefficient matrix (e.g., the part representing the high-frequency components of the image block) to be the smaller matrix. And thus, the final fingerprint may be a representation of a different component other than the low-frequency components of the image block.

Figure 7:
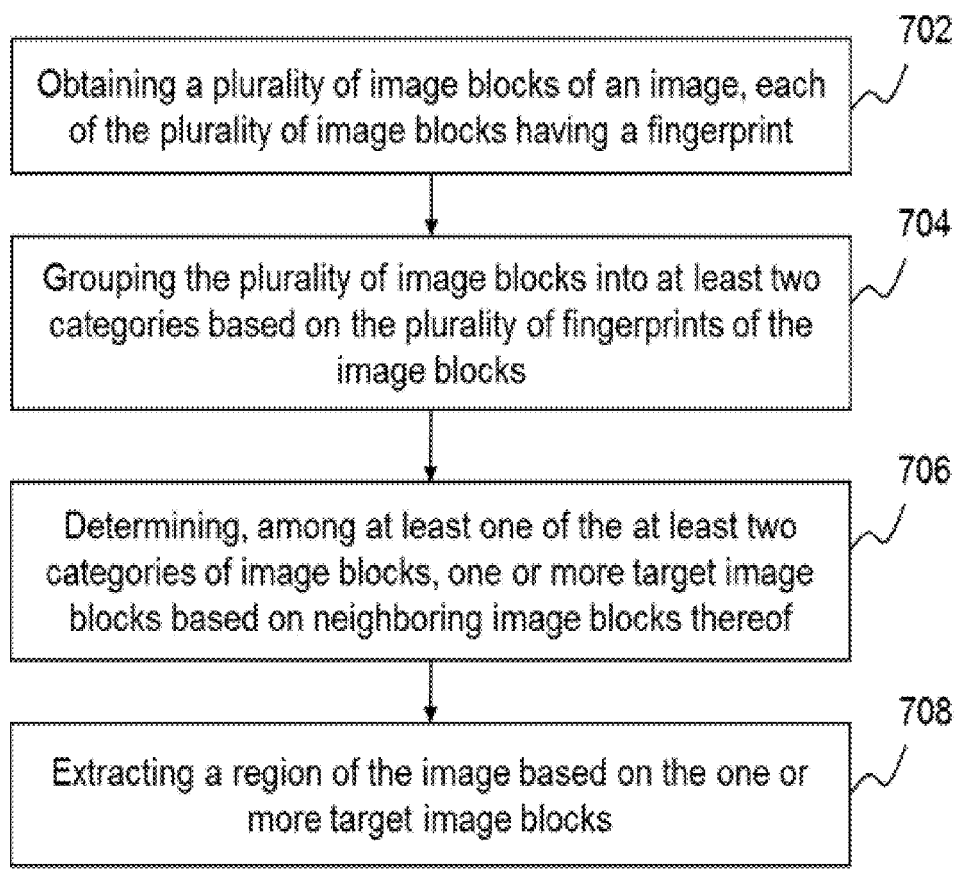
FIG. 7 is a flowchart illustrating an exemplary process for extracting a region from an image according to some embodiments of the present disclosure.

FIG. 7 is a flowchart illustrating an exemplary process for extracting a region from an image according to some embodiments of the present disclosure. The process 700 may be executed by the image processing system 100. For example, the process 600 may be implemented as a set of instructions (e.g., an application) stored in the storage ROM 220 or RAM 230. The CPU 210 may execute the set of instructions and may accordingly be directed to perform the process 700. The process 700 may be executed by the modules in the image processing device 120. The operations of the illustrated process presented below are intended to be illustrative. In some embodiments, the process may be accomplished with one or more additional operations not described, and/or without one or more of the operations discussed. Additionally, the order in which the operations of the process as illustrated in FIG. 7 and described below is not intended to be limiting. In some embodiments, operations 508 and 510 may be achieved by performed the process 700.

In 702, the image processing device 120 may obtain a plurality of image blocks of an image. Each of the plurality of image blocks may have a fingerprint. In some embodiments, the plurality of image blocks may be the same image blocks as described in operation 504. The fingerprint may be a specific code that is corresponding to one or more features of the image block. For example, the fingerprint may represent one or more features of the image block, such as, the color of the image block, the size of the image block, the texture of the image block, the gray level of the image block, the brightness of the image block, or the contrast ratio of the image block, etc.

In 704, the image processing device 120 may group the plurality of image blocks into at least two categories based on the plurality of fingerprints of the image blocks.

In some embodiments, the plurality of image blocks may be grouped into a foreground category and a background category, provided that the fingerprint of each image block may represent a texture feature thereof. As another example, the plurality of image blocks may be grouped into a light-colored category and a dark-colored category, provided that the fingerprint of each image block may represent a color feature thereof. As still another example, the plurality of image blocks may be grouped into a category corresponding to the region of interest and a category corresponding to the region of no interest.

The image processing device 120 may group the image blocks whose fingerprints satisfy a first condition into a first group, and group the image blocks whose fingerprints satisfy a second condition into a second group. The conditions (e.g., the first condition and the second condition) utilized to differentiate different categories may be set according to a specific rule.

For illustration purpose, taking the fingerprint generated as described in operation 616 of FIG. 6 as an example, the plurality of image blocks may be grouped as follows.

In some embodiments, the image processing device 120 may group the image blocks into at least two categories based on the number of "0" or "1" in each of the fingerprints. For example, if the number of "1" in the binary code of a fingerprint is larger than a first preset threshold, the corresponding image block may be designated as one of the image blocks in the category corresponding to the region of interest that includes more intensive brightness/color change then other regions. The first preset threshold may be determined by a technician. In some embodiments, the first preset threshold may be dynamically adjusted based on one or more processing results of the image processing system 100 to improve the accuracy of the image segmentation.

In some embodiments, the image processing device 120 may group the image blocks into at least two categories based on the distribution of "0" or "1" in each of the fingerprints. For example, if at least one "1" exists in the positions other than the last m bits of the binary code of a fingerprint, the corresponding image block may be designated as one of the image blocks in the category corresponding to the region of interest that includes more intensive brightness/color change than other regions. The value of m may be determined by a technician. In some embodiments, the value of m may be dynamically adjusted based on one or more processing results of the image processing system 100 to improve the accuracy of the image segmentation.

In some embodiments, the image processing device 120 may group the image blocks into at least two categories based on the number and distribution of "0" or "1" in each of the fingerprints. For example, if the number of "1" that exists in the last k bits of the binary code of a fingerprint is larger than a second threshold, the corresponding image block may be designated as one of the image blocks in the category corresponding to the region of interest that includes more intensive brightness/color change than other regions. For another example, if the number of "1" that exists in the last j bits of the binary code of a fingerprint is less than a third threshold, the corresponding image block may be designated as one of the image blocks in the category corresponding to the region of no interest that includes less brightness/color change than other regions. The values of k, j, the second threshold, and the third threshold may be determined by a technician. In some embodiments, the values of k, j, the second threshold, and the third threshold may be dynamically adjusted based on one or more processing results of the image processing system 100 to improve the accuracy of the image segmentation. In some embodiments, the value of k may be equal to the value of j. In some embodiments, the image blocks in the category corresponding to the region of interest may be designated as a portion of the foreground, and the image blocks in the category corresponding to the region of no interest may be designated as a portion of the background.

In 706, the image processing device 120 may determine, among at least one of the at least two categories of image blocks, one or more target image blocks based on one or more neighboring image blocks thereof. In some embodiments, the target image block(s) may be the image blocks inside or outside the region of interest, rather than the image blocks on the boundary of the region of interest.

The one or more target image blocks may be selected from the image blocks in the at least two categories according to a filtering operation. For example, the filtering operation may include determining the category to which the one or more neighboring image blocks of a candidate image block belongs. In some embodiments, the one or more neighboring image blocks may include four neighboring image blocks of the candidate image block (i.e., the adjacent image blocks above, below, on the left of, and on the right of, the candidate image block). Alternatively, the one or more neighboring image blocks may include eight neighboring image blocks of the candidate image block (i.e., the adjacent image blocks above, below, on the left of, on the right of, on the top left, on the top right, one the bottom left, and on the bottom right of the candidate image block).

In some embodiments, if all the neighboring image blocks of the candidate image block belong to the same category, the candidate image block may be designated as the target image block. For example, if all the four neighboring image blocks of a candidate image block belong to the foreground category, the candidate image block may be designated as an image block of the foreground. Alternatively, for each candidate image block, if the ratio of its neighboring image blocks that belongs to one category to all of its neighboring image blocks exceeds a threshold, the candidate image block may be designated as the target image block. The threshold may be any value, e.g., 75%, set by a technician.

In some embodiments, the image processing device 120 may traverse the plurality of image blocks to select all the target image blocks in each of the at least two categories. Then, the image processing device 120 may keep the target image blocks and omit other image blocks in the image. More detailed description of the determination of target image blocks may be found elsewhere in the present disclosure (e.g., in FIG. 9A and FIG. 9B).

In 708, the image processing device 120 may extract a region of the image based on the one or more target image blocks.

In some embodiments, the image processing device 120 may extract a region associated with the region of interest from the image based on a GrabCut algorithm or a GraphCut algorithm. For example, the image processing device 120 may designate at least a portion of the region of interest (e.g., delineate a line within the region of interest) by combining multiple target image blocks in the category corresponding to the region of interest. The portion of the region of interest may be generated by connecting two or more target image blocks. Then, the image processing device 120 may traverse the image and extract the area that is similar to the designated portion of the region of interest according to the GrabCut/GraphCut algorithm.

In some embodiments, the image device may process the target image blocks of different categories to extract different portions of the image, respectively. The different portions of the image may include a foreground of the image and a background of the image.

In some embodiments, the image processing device 120 may extract the region by curve fitting. The image processing device 120 may identify the image blocks that lie on the boundary of the region of interest from the category corresponding to the region of interest, and fit the boundary curve of the region of interest, accordingly. For example, the image processing device 120 may designate the image block whose neighboring image blocks belong to different categories as one image blocks that lies on the boundary of the region of interest. The region delimited by the boundary curve may be extracted from the image as the region of interest.

In some embodiments, the boundary of the extracted region may be unsmoothed, or the extracted region may need a further processing. The image processing device 120 may optimize the extracted region to generate a more accurate region of interest based on an optimization algorithm. The optimization algorithm may include a genetic algorithm (GA), an ant colony optimization (ACO), a simulated annealing (SA), a particle swarm optimization (PSO), etc. Specifically, the image processing device 120 may smooth the boundary of the extracted region or enlarge the size of the extracted region.

It should be noted that the above description of the process 700 is merely provided for the purposes of illustration, and not intended to limit the scope of the present disclosure. For persons having ordinary skills in the art, various variations and modifications may be performed in the light of the present disclosure. For example, operation 708 may be divide into two steps. As another example, operation 702 may be combined with operation 704.

Figure 8A:
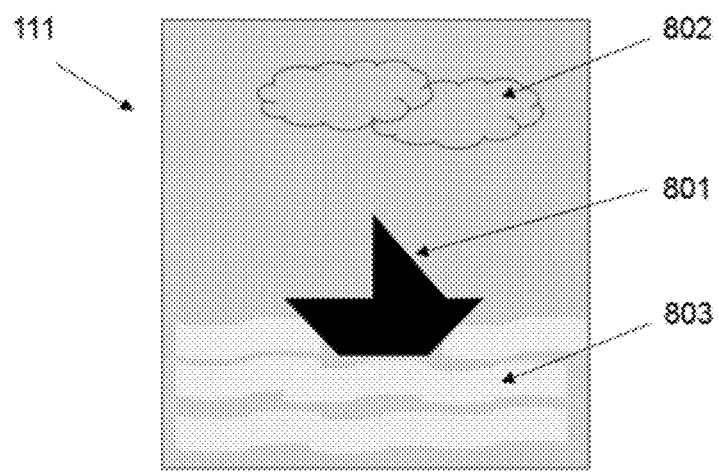
FIG. 8A illustrates an example of an image including a region of interest according to some embodiments of the present disclosure.

FIG. 8A illustrates an example of an image including a region of interest according to some embodiments of the present disclosure. As shown in FIG. 8A, the image 111 may represent a boat sailing in the lake. The boat 801 may be deemed as a region of interest and form the foreground of the image 111. The background of the image 111 may be formed by the cloud 802, and the lake 803, etc.

Figure 8B:
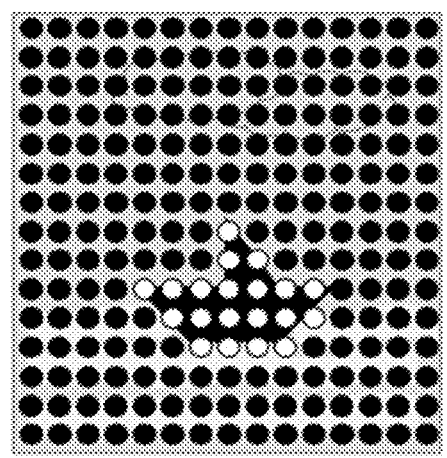
FIG. 8B illustrates examples of the image blocks of the image according to some embodiments of the present disclosure.

FIG. 8B illustrates exemplary image blocks of the image 111 according to some embodiments of the present disclosure. As shown in FIG. 8B, the image 111 was divided into a plurality of image blocks each of which may be represented by a dot (a white dot or a black dot). The plurality of image blocks were grouped into two categories represented by the white dots and black dots, respectively. The grouping was achieved according to some embodiments of the present disclosure, e.g., operation 508 or 704. The white dots represent the image blocks that belong to the foreground (region of interest) of the image 111, and the black dots represent the image blocks that belong to the background of the image 111. It shall be noted that the white dots almost overlap the boat 801.

Figure 9A:
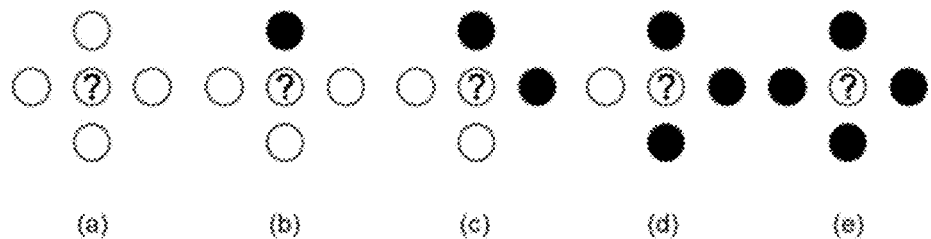
FIG. 9A illustrates five examples of neighboring image blocks of a candidate image block according to some embodiments of the present disclosure.

FIG. 9A illustrates five examples (a), (b), (c), (d), and (e) of neighboring image blocks of a candidate image block according to some embodiments of the present disclosure. As shown in FIG. 9A, the dot in each example marked with a symbol "?" represents a candidate image block.

As described in connection with some embodiments of the present disclosure (e.g., operation 706), the image processing device 120 may determine whether a candidate image block is a target image block. In the example (a), the four neighboring dots of the candidate image block are all white dots, which means that all the four neighboring image blocks of the candidate image block belong to the foreground of the image 111. The ratio of the neighboring image blocks that belong to the foreground to all the four neighboring image blocks is 100%, and the ratio of the neighboring image blocks that belong to the background to all the four neighboring image blocks is 0. In the example (b), three of the four neighboring dots are white dots, which means that three of the four neighboring image blocks of the candidate image block belong to the foreground of the image 111. The ratio of the neighboring image blocks that belong to the foreground to all the four neighboring image blocks is 75%, and the ratio of the neighboring image blocks that belong to the background to all the four neighboring image blocks is 25%. In the example (c), two of the four neighboring dots are white dots, which means that two of the four neighboring image blocks of the candidate image block belong to the foreground of the image 111. The ratio of the neighboring image blocks that belong to the foreground to all the four neighboring image blocks is 50%, and the ratio of the neighboring image blocks that belong to the background to all the four neighboring image blocks is also 50%. In the example (d), only one of the four neighboring dots is white dot, which means that only one of the four neighboring image blocks of the candidate image block belongs to the foreground of the image 111. The ratio of the neighboring image blocks that belong to the foreground to all the four neighboring image blocks is 25%, and the ratio of the neighboring image blocks that belong to the background to all the four neighboring image blocks is 75%. In the example (e), the four neighboring dots are all black dots, which means that all the four neighboring image blocks of the candidate image block belong to the background of the image. The ratio of the neighboring image blocks that belong to the foreground to all the four neighboring image blocks is 0, and the ratio of the neighboring image blocks that belong to the background to all the four neighboring image blocks is 100%.

Figure 9B:
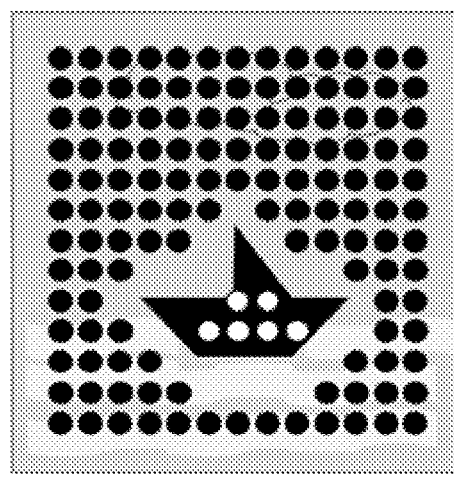
FIG. 9B illustrates the target image blocks of FIG. 8B according to some embodiments of the present disclosure.

FIG. 9B illustrates the target image blocks of FIG. 8B according to some embodiments of the present disclosure. As shown in FIG. 9B, the target image blocks, including the target image blocks in the foreground (white dots) and the target image blocks in the background (black dots) of the image, are shown in the FIG. 9B.

To obtain the target image blocks as shown in FIG. 9B, the image processing device 120 may perform the filtering operation as described in 706. Specifically, to obtain the target blocks in the foreground, the image processing device 120 may designate the image blocks whose four neighboring image blocks are identical to the example (a) (i.e., the ratio of the neighboring image blocks that belong to the foreground to all the four neighboring image blocks is 100%) as the target image blocks in the foreground. Similarly, to obtain the target blocks in the background, the image processing device 120 may designate the image blocks whose four neighboring image blocks are identical to the example (e) (i.e., the ratio of the neighboring image blocks that belong to the background to all the four neighboring image blocks is 100%) as the target image blocks in the background. The image processing device 120 may keep the target image blocks and omit the other image blocks in the image 111, thus forming the target image blocks as shown in FIG. 9B.

In some alternative embodiments, the image processing device 120 may also designate the image block, whose ratio of the neighboring image blocks that belong to the foreground to all the four neighboring image blocks exceeds a threshold (e.g., 70%), as the target image block in the foreground. As such, the image blocks whose four neighboring image blocks are identical to the example (b) may also be designated as the target image blocks in the foreground.

Figure 10A:
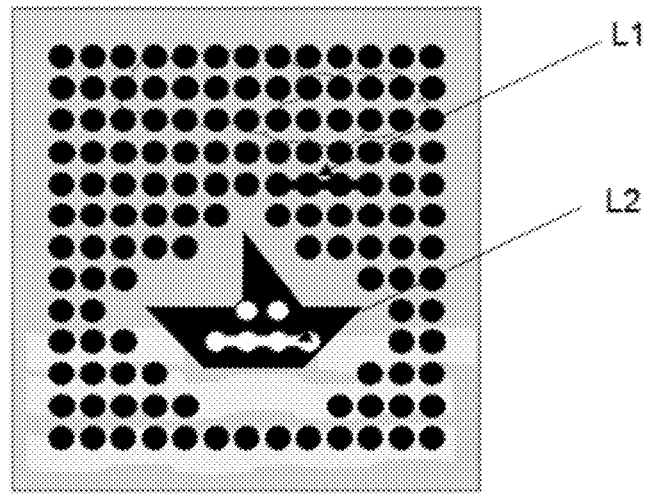
FIG. 10A illustrates an example of depicting a portion of the region of interest according to some embodiments of the present disclosure.

FIG. 10A illustrates an example of depicting a portion of the region of interest according to some embodiments of the present disclosure. The portion of the region of interest may be a line or a figure by connecting at least two of the target image blocks. As shown in FIG. 10A, the line L1 is the portion of the background of the image 111, and the line L2 is the portion of the foreground of the image 111. The lines L1 and L2 may be used as the input of an image segmentation algorithm. The image processing device 120 may traverse the image 111 and extract the region that has similar features as the lines L1 or L2.

Figure 10B:
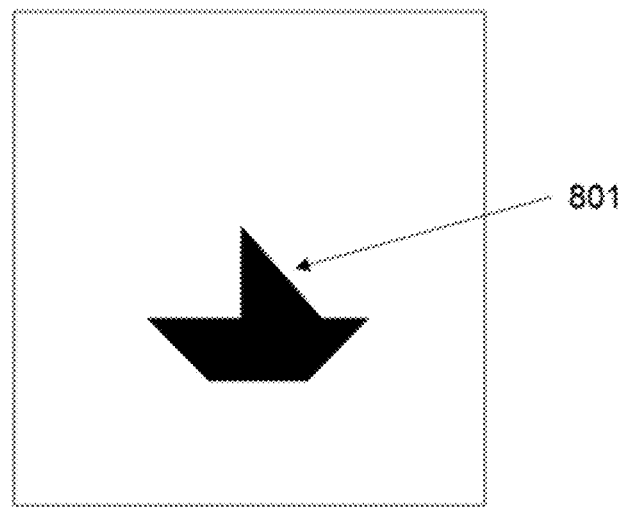
FIG. 10B illustrates an extracted region of FIG. 10A according to some embodiments of the present disclosure.

FIG. 10B illustrates an extracted region of FIG. 10A according to some embodiments of the present disclosure. As shown in the FIG. 10B, the region of interest (the boat 801) was extracted from the image 111, with other regions of the image 111 discarded.

In some embodiments, the extracted region may be further processed as described elsewhere in the present disclosure. For example, the image processing device 120 may implement an optimizing algorithm to the extracted region to smoothen the boundary of the extracted region. The optimizing algorithm includes Genetic Algorithm (GA), Ant colony optimization (ACO), Simulated Annealing (SA), and Particle Swarm Optimization (PSO), etc.

It should be noted that the description above associated with FIG. 8 to FIG. 10 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. Similar modifications should fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

We claim:

1. A system for image segmentation, comprising:
  a storage medium storing a set of instructions; and
  at least one processor in communication with the storage medium, wherein when executing the set of instructions, the at least one processor is directed to:
    obtain an image;
    divide the image into a plurality of image blocks;
    determine, for each of the plurality of image blocks, a compressed representation of one or more features of the image block;
    group the plurality of image blocks into at least two different categories based on the plurality of compressed representations; and
    extract a region of interest from the image based on at least one of the at least two different categories of the plurality of image blocks, wherein
    for each of the plurality of image blocks, the compressed representation of the one or more features of the image block includes a set of binary codes; and
    the plurality of image blocks are grouped based on a bit distribution in the set of binary codes.

2. The system of claim 1, wherein the set of binary codes are generated according to a perceptual hash algorithm.

3. The system of claim 1, wherein for each of the plurality of image blocks, the one or more features of the image block include a texture feature of the image block.

4. The system of claim 1, wherein the at least two different categories include a category associated with a foreground of the image and a category associated with a background of the image.

5. The system of claim 1, wherein to extract a region of interest from the image based on at least one of the at least two different categories of the plurality of image blocks, the at least one processor is directed to:
   determine, among the at least one of the at least two different categories of image blocks, one or more target image blocks based on one or more neighboring image blocks thereof; and
   extract the region of interest from the image based on the one or more target image blocks.

6. The system of claim 5, wherein to extract the region of interest from the image based on the one or more target image block, the at least one processor is directed to:
   merge the one or more target image blocks that belong to one of the at least two different categories to form the region of interest.

7. The system of claim 5, wherein to extract the region of interest from the image based on the one or more target image blocks, the at least one processor is directed to:
   connect two or more of the one or more target image blocks; and
   extract the region of interest from the image based on the connected two or more of the one or more target image blocks.

8. The system of claim 5, wherein to determine, among at least one of the at least two different categories of image blocks, one or more target image blocks based on one or more neighboring image blocks thereof, the at least one processor is directed to:
   determine a candidate image block and its one or more neighboring image blocks;
   determine, for each of the one or more neighboring image blocks of the candidate image block, a category to which the neighboring image block belongs; and
   designate the candidate image block as a target image block in response to that the one or more neighboring image blocks of the candidate image block belong to a same category.

9. The system of claim 1, wherein the at least one processor is further directed to:
   optimize the extracted region of interest.

10. A method for image segmentation, implemented on a computing device including at least one processor and at least one storage medium, the method comprising:
    obtaining an image;
    dividing the image into a plurality of image blocks;
    determining, for each of the plurality of image blocks, a compressed representation of one or more features of the image block;
    grouping the plurality of image blocks into at least two different categories based on the plurality of compressed representations; and
    extracting a region of interest from the image based on at least one of the at least two different categories of the plurality of image blocks, wherein
    for each of the plurality of image blocks, the compressed representation of the one or more features of the image block includes a set of binary codes; and
    the plurality of image blocks are grouped based on a bit distribution in the set of binary codes.

11. The method of claim 10, wherein extracting a region of interest from the image based on at least one of the at least two different categories of the plurality of image blocks, including:
    determining, among at least one of the at least two different categories of image blocks, one or more target image blocks based on one or more neighboring image blocks thereof; and
    extracting the region of interest from the image based on the one or more target image blocks.

12. The method of claim 11, wherein extracting the region of interest from the image based on the one or more target image block, including:
    merging the one or more target image blocks that belong to one of the at least two different categories to form the region of interest.

13. The method of claim 11, wherein extracting the region of interest from the image based on the one or more target image blocks, including:
    connecting two or more of the one or more target image blocks; and
    extracting the region of interest from the image based on the connected two or more of the one or more target image blocks.

14. The method of claim 11, wherein determining, among at least one of the at least two different categories of image blocks, one or more target image blocks based on one or more neighboring image blocks thereof, including:
    determining a candidate image block and its one or more neighboring image blocks;
    determining, for each of the one or more neighboring image blocks of the candidate image block, a category to which the neighboring image block belongs; and
    designating the candidate image block as a target image block in response to that the one or more neighboring image blocks of the candidate image block belong to a same category.

15. The method of claim 10, further including:
    optimizing the extracted region of interest.

16. A non-transitory computer readable medium, comprising a set of instructions for image segmentation, wherein when executed by at least one processor, the set of instructions directs the at least one processor to:
    obtain an image;
    divide the image into a plurality of image blocks;
    determine, for each of the plurality of image blocks, a compressed representation of one or more features of the image block;
    group the plurality of image blocks into at least two different categories based on the plurality of compressed representations; and
    extract a region of interest from the image based on at least one of the at least two different categories of the plurality of image blocks, wherein
    for each of the plurality of image blocks, the compressed representation of the one or more features of the image block includes a set of binary codes; and
    the plurality of image blocks are grouped based on a bit distribution in the set of binary codes.

* * * * *